(12) United States Patent
Dannoura

(10) Patent No.: US 10,205,175 B2
(45) Date of Patent: Feb. 12, 2019

(54) WATER BATTERY

(71) Applicant: Mishima Denshi Co., Ltd., Tokyo (JP)

(72) Inventor: Toshikatsu Dannoura, Tokyo (JP)

(73) Assignee: Mishima Denshi Co., Ltd., Tokyo (JP)

( * ) Notice: Subject to any disclaimer, the term of this patent is extended or adjusted under 35 U.S.C. 154(b) by 637 days.

(21) Appl. No.: 14/780,631

(22) PCT Filed: Apr. 8, 2014

(86) PCT No.: PCT/JP2014/060224
§ 371 (c)(1),
(2) Date: Sep. 28, 2015

(87) PCT Pub. No.: WO2014/168155
PCT Pub. Date: Oct. 16, 2014

(65) Prior Publication Data
US 2016/0056477 A1 Feb. 25, 2016

(30) Foreign Application Priority Data

Apr. 10, 2013 (JP) ................................ 2013-082027

(51) Int. Cl.
*H01M 6/32* (2006.01)
*H01M 2/16* (2006.01)
(Continued)

(52) U.S. Cl.
CPC ............... *H01M 6/32* (2013.01); *H01M 2/16* (2013.01); *H01M 4/466* (2013.01); *H01M 6/04* (2013.01);
(Continued)

(58) Field of Classification Search
CPC ............ H01M 2/16; H01M 6/04; H01M 6/32; H01M 6/36; H01M 6/045; H01M 4/466;
(Continued)

(56) References Cited

U.S. PATENT DOCUMENTS 2,817,697 A * 12/1957 Chubb .................... H01M 6/04
429/119
3,647,555 A * 3/1972 Daniel .................... H01M 6/32
429/116
(Continued)

*Primary Examiner* — Jonathan G Leong
*Assistant Examiner* — Claire L Roe
(74) *Attorney, Agent, or Firm* — Haug Partners LLP; William S. Frommer

(57) ABSTRACT

A water battery includes a housing and at least one battery cell mounted in the housing, capable of operating by injecting water into the housing at the time of use. The at least one battery cell includes an anode made of a metal material with a lower ionization tendency than that of a magnesium, an anode drawer electrode electrically connected to the anode, a cathode made of a magnesium material, a cathode drawer electrode electrically connected to the cathode, a collector electrode mounted between the anode and the cathode, a sheet member with water absorptivity and water retention, closely attached to the collector electrode, and a fixing member for pressing to each other and fixing together the anode, the collector electrode, the sheet member and the cathode. The sheet member includes an electrolyte containing nitrophenol, sodium, citric acid and polyvinyl alcohol.

20 Claims, 20 Drawing Sheets

(51) Int. Cl.
  *H01M 6/04* (2006.01)
  *H01M 6/36* (2006.01)
  *H01M 4/46* (2006.01)
  *H01M 4/02* (2006.01)
(52) U.S. Cl.
  CPC ............ *H01M 6/045* (2013.01); *H01M 6/36* (2013.01); *H01M 2004/028* (2013.01); *H01M 2220/10* (2013.01); *H01M 2300/0005* (2013.01)
(58) Field of Classification Search
  CPC ... H01M 2004/028; H01M 2300/0005; H01M 2220/10
  USPC .......................................... 429/116, 118, 119
  See application file for complete search history.

(56) References Cited

U.S. PATENT DOCUMENTS

| | | | | |
|---|---|---|---|---|
| 4,389,470 | A | * | 6/1983 | Plasse ..................... H01M 6/48 429/144 |
| 5,480,743 | A | * | 1/1996 | McCarter ................ H01M 6/34 429/100 |
| 2006/0105230 | A1 | * | 5/2006 | Fitter .................... H01M 2/362 429/61 |
| 2006/0281000 | A1 | * | 12/2006 | Hayashigawa ........... B66F 9/24 429/63 |
| 2007/0121276 | A1 | * | 5/2007 | Uzawa ................... H01G 9/035 361/503 |

* cited by examiner

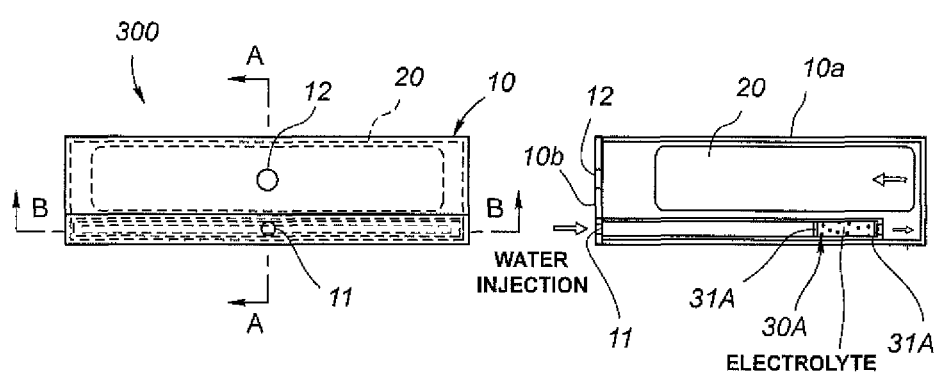
Fig. 11a
Fig. 11b
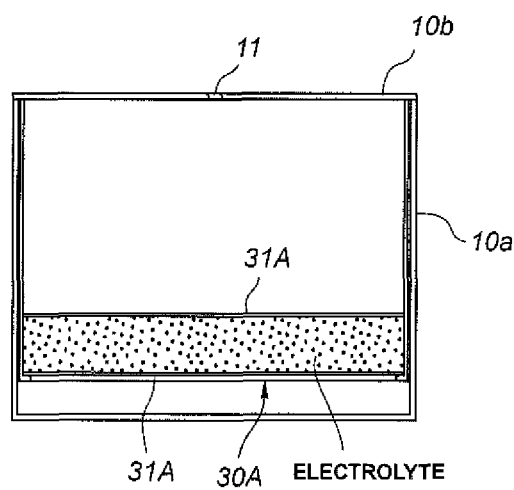
Fig. 11c

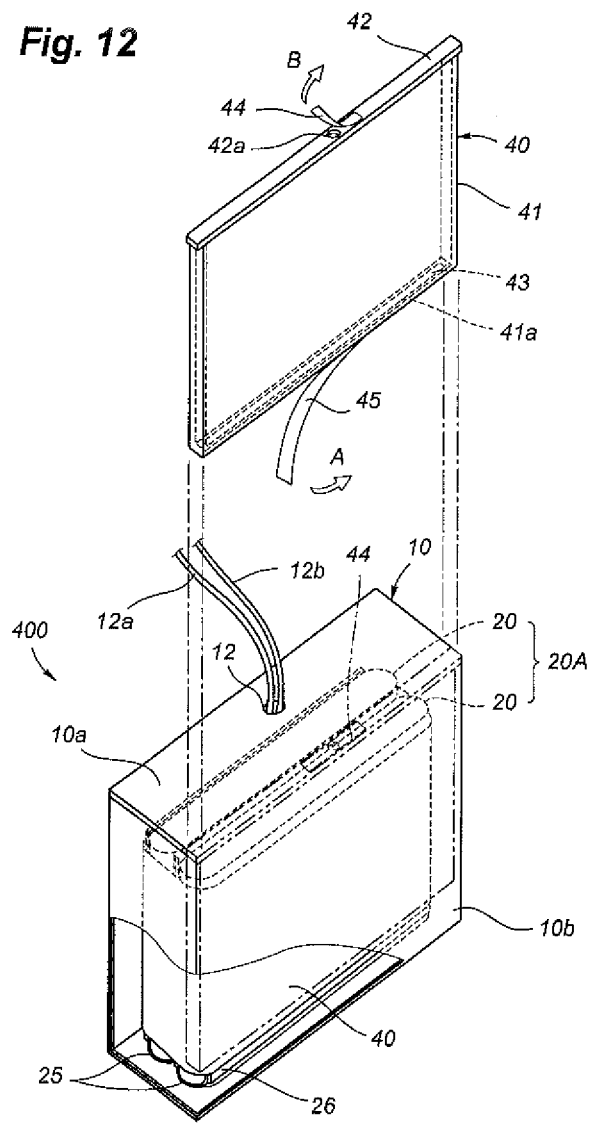

ELECTROLYTE

WATER BATTERY

BACKGROUND OF THE INVENTION

Field of the Invention

The present invention relates to a water battery, using dissimilar electrodes having different ionization tendencies as for an anode and a cathode, for producing electrochemical reaction to generate electrical power by injecting water or electrolyte therein.

Description of the Related Art

Well-known are water batteries or seawater batteries for generating electrical power by immersing their dissimilar electrodes having different ionization tendencies in water or seawater, and many of proposals for obtaining higher performance in such water batteries or seawater batteries have been taken.

For example, in Japanese patent Publication No. 2011-222236A, a small water battery capable of generating a predetermined electromotive force by supplying a very small amount of water therein is proposed.

The water battery disclosed in Japanese patent Publication No. 2011-222236A has, between an anode plate and a cathode plate, an anode-active substance layer arranged to contact with an inner surface of the anode plate and an electrical insulator layer located between the anode plate and an inner surface of the cathode plate. Both outer surfaces of the anode plate and the cathode plate are covered by external capsule seats.

In Japanese Patent No. 4759659, the applicant of this application has proposed a water battery having a plurality of battery cells, capable of storing for a long period of time and capable of using as an emergency power supply.

Each battery cell of the water battery disclosed in Japanese Patent No. 4759659 has a carbon cloth constituting an anode, an anode drawer electrode electrically connected to, the carbon cloth, a salt-containing cloth closely-attached to the carbon cloth, a paper sheet provided with water absorptivity and closely-attached to the salt-containing cloth, a metal plate constituting a cathode, which metal plate is made of a material with a higher ionization tendency than that of the anode and closely-attached to the paper sheet, a cathode drawer electrode electrically connected to the metal plate, and a shrinkage cover for pressure bonding the carbon cloth, the anode drawer electrode, the salt-containing cloth, the paper sheet, the metal plate and the cathode drawer electrode with each other. The salt-containing cloth is configured from a cloth formed by a plurality of cotton weaving layers.

However, according to such the conventional water battery using a magnesium metal as the cathode, magnesium hydroxide produced by the electrochemical reaction may be precipitated on the surface of the cathode. Thus, when the density of the electrolysis solution is low, the electrochemical reaction between the anode and the cathode becomes extremely sluggish to reduce its electromotive force. On the other hands, when the density of the electrolysis solution is high, the electrochemical reaction between the anode and the cathode quickly occurs to block new electrochemical reaction due to the magnesium hydroxide precipitated.

Further, although the water battery described in Japanese Patent No. 4759659 can quickly provide electromotive force with a predetermined level, it is impossible to maintain the production of the electromotive force for a long period of time.

In recent years, it is expected to obtain a water battery as for an emergency battery used at the time of disaster, capable of preserving for a long period of time and of generating electrical power only by injecting liquid there into in case of emergency.

SUMMARY OF THE INVENTION

It is therefore an object of the present invention to provide a water battery having improved electromotive force characteristics and capable of maintaining a stable electrical discharge for a long period of time.

Another object of the present invention is to provide a water battery capable of preserving for a long period of time and having excellent shelf characteristics.

According to the present invention, a water battery includes a housing and at least one battery cell mounted in the housing, capable of operating by injecting water into the housing at the time of use. The at least one battery cell includes an anode made of a metal material with a lower ionization tendency than that of a magnesium, an anode drawer electrode electrically connected to the anode, a cathode made of a magnesium material, a cathode drawer electrode electrically connected to the cathode, a collector electrode mounted between the anode and the cathode, a sheet member with water absorptivity and water retention, closely attached to the collector electrode, and a fixing member for pressing to each other and fixing together the anode, the collector electrode, the sheet member and the cathode. The sheet member includes an electrolyte containing nitrophenol, sodium, citric acid and polyvinyl alcohol.

The sheet member with a water absorptivity and water retentivity is provided and the sheet member includes an electrolyte containing nitrophenol, sodium, citric acid and polyvinyl alcohol. Thus, it is possible to restrain precipitation of magnesium hydroxide on the surface of the cathode occurred by an electrochemical reaction, and therefore a stable electrical discharge can be maintained for a long period of time.

It is preferred that the anode is formed from a metal plate, and the collector electrode is closely attached to a surface of the anode, that the sheet member comprises a water absorptive sheet having water absorptivity, closely attached to an outer surface of the collector electrode, and a water-holding sheet having water retentivity, closely attached to an outer surface of the water absorptive sheet, that the cathode is formed from two magnesium plates closely attached to outer faces of the water absorptive sheet, respectively, and the cathode drawer electrode is electrically connected to the two magnesium plates, and that the water absorptive sheet includes an electrolyte containing nitrophenol, sodium, citric acid and polyvinyl alcohol. Because two cathodes are provided with respect to one anode, the area of the collector electrode, the electrolyte containing sheet and the cathode becomes large resulting to improve the electromotive force characteristics of the water battery. Also, since the electrolyte contained in the water absorptive sheet includes nitrophenol, sodium, citric acid and polyvinyl alcohol, it is possible to restrain precipitation of magnesium hydroxide on the surface of the cathode occurred by an electrochemical reaction, and therefore a stable electrical discharge can be maintained for a long period of time.

It is also preferred that the cathode is formed from a magnesium plate, that the sheet member includes a water-holding sheet having water retentivity, closely attached to an outer side face of the cathode, and a water absorptive sheet having water absorptivity, closely attached to an outer face of the water-holding sheet, that the anode is formed from two metal plates closely attached to outer faces of the water absorptive sheet, respectively, and the cathode drawer electrode is electrically connected to the two metal plates, and that the water absorptive sheet includes an electrolyte containing nitrophenol, sodium, citric acid and polyvinyl alcohol. Because two anode are provided with respect to one cathode, the area of the collector electrode, the electrolyte containing sheet and the anode becomes large resulting to improve the electromotive force characteristics of the water battery. Also, since the electrolyte contained in the water absorptive sheet includes nitrophenol, sodium, citric acid and polyvinyl alcohol, it is possible to restrain precipitation of magnesium hydroxide on the surface of the cathode occurred by an electrochemical reaction, and therefore a stable electrical discharge can be maintained for a long period of time.

It is further preferred that the water battery further includes an electrolyte cell filled with the electrolyte. Thus, an electrolyte can be refilled by injecting water in the housing and therefore a stable electrical discharge can be maintained for a long period of time.

It is still further preferred that the electrolyte cell is arranged on a bottom of the housing. Thus, an electrolysis solution can be distributed over the bottom of the housing and therefore the solution can be evenly drawn up by the water absorptive sheet.

It is further preferred that the electrolyte cell is arranged between an inner side wall of the housing and the at least one battery cell. Thus, it is possible to increase a volume of the electrolyte cell and therefore a refilled amount of the electrolyte can be secured.

It is still further preferred that the water battery further includes an electrolysis solution cell filled with a solution of the electrolyte, and the electrolysis solution cell is a removable cassette-type. Thus, it is possible to start the generation of electromotive force without injecting water and therefore an electrolyte can be refilled and the electrolyte cell can be exchanged.

It is further preferred that the cathode is made of a magnesium material formed in a circular columnar shape or a rectangular columnar shape, and the cathode drawer electrode is mounted in a hole formed at an upper part of the cathode, that the sheet member is closely attached to a side face of the cathode, wherein the collector electrode is closely attached to outside of the sheet member, and that the anode is closely attached to outside of the collector electrode. Also, it is preferred that the electrolyte is filled in a lower part of the housing. Thus, compact constitutions of the water battery can be obtained and production thereof becomes easy.

It is still further preferred that the water battery includes the housing and a battery cell unit consisting of a plurality of battery cells mounted in the housing, and that the plurality of battery cells are electrically connected in parallel or in series with each other. Thus, the electromotive force characteristics of the water battery can be improved and a stable electrical discharge can be maintained for a long period of time.

It is further preferred that the water battery includes the housing and a battery cell unit consisting of a plurality of battery cells mounted in the housing, and that a common anode or cathode is arranged between neighboring battery cells of the plurality of battery cells. Thus, the battery cell unit becomes compact and the manufacturing cost can be reduced.

It is further preferred that the sheet member or the water absorptive sheet includes the electrolyte containing nitrophenol of 0.1-0.5 wt %, sodium of 1-26 wt %, citric acid of 0.5-8 wt % and polyvinyl alcohol of 0.1-1.0 wt %.

The water battery according to the present invention can improve the electromotive force characteristics and a stable electrical discharge can be maintained for a long period of time. Also, the shelf characteristics of the water battery can be improved by arranging the sheet member having water absorptivity and water retentivity and the collector electrode between the anode and the cathode. Thus, the water battery can generate electrical power as an emergency battery used at the time of disaster only by injecting liquid such as water there into.

Further objects and advantages of the present invention will be apparent from the following description of the preferred embodiments of the invention as illustrated in the accompanying drawings.

BRIEF DESCRIPTION OF THE DRAWINGS

FIGS. 11a, 11b and 11c are a plane view and sectional views schematically illustrating configuration of the water battery in the third embodiment according to the present invention;

FIG. 12 is a perspective view schematically illustrating configuration of a water battery in a fourth embodiment according to the present invention;

DESCRIPTION OF THE PREFERRED EMBODIMENTS

Hereinafter, embodiments of a water battery according to the present invention will be described with reference to the attached figures.

Figure 1:
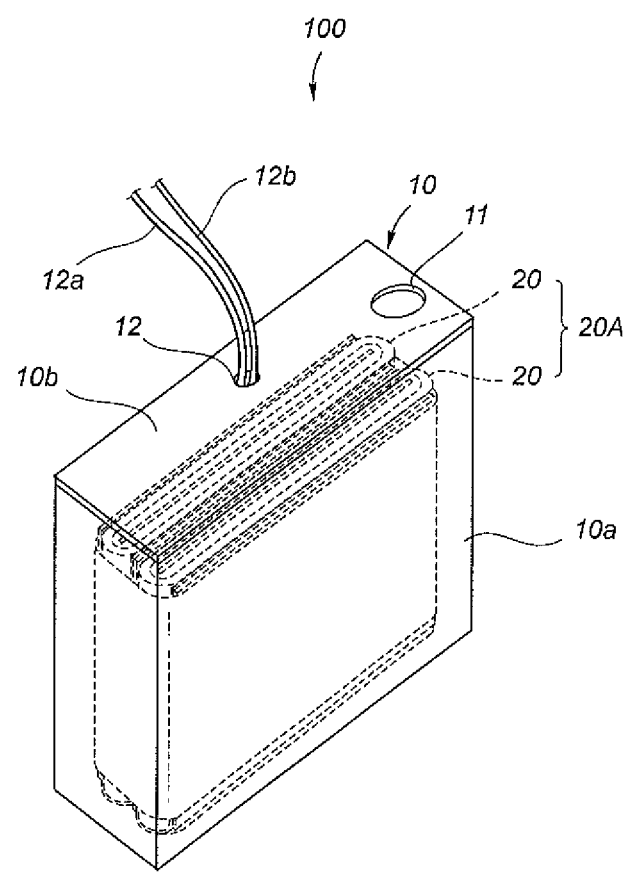
FIG. 1 is a perspective view schematically illustrating configuration of a water battery in a first embodiment according to the present invention.
Figure 2:
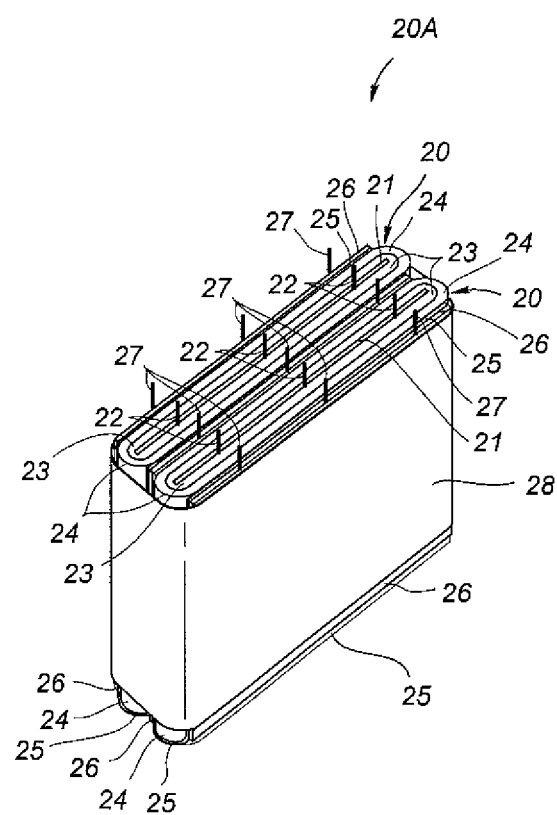
FIG. 2 is a perspective view illustrating configuration of a battery cell unit in the first embodiment shown in FIG. 1.
Figure 3A:
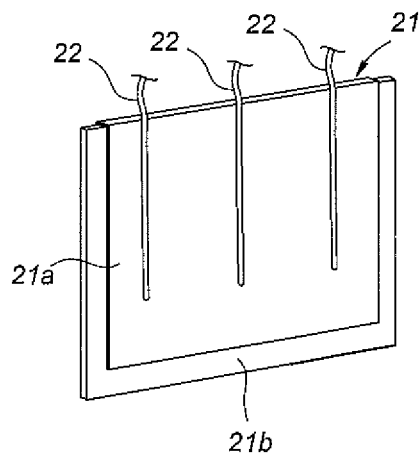
FIGS. 3a, 3b, 3c and 3d are perspective views illustrating in detail configuration of battery cells in the first embodiment shown in FIG. 1.
Figure 3B:
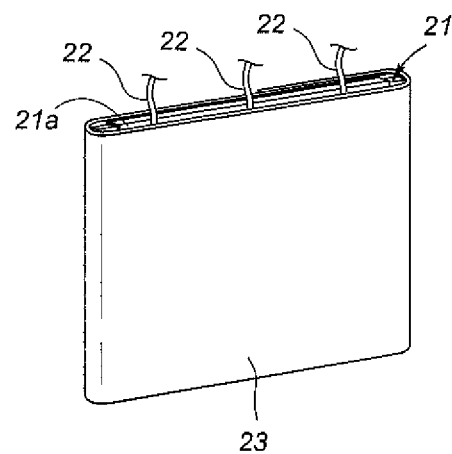
Figure 3C:
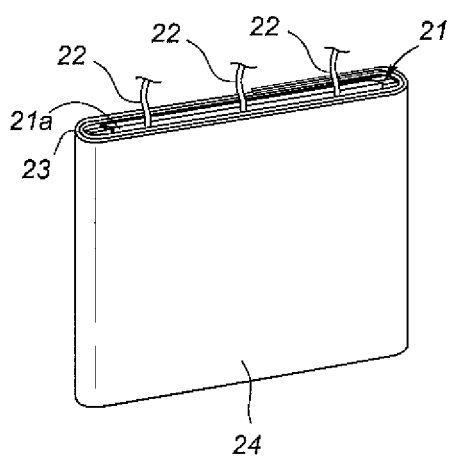
Figure 3D:
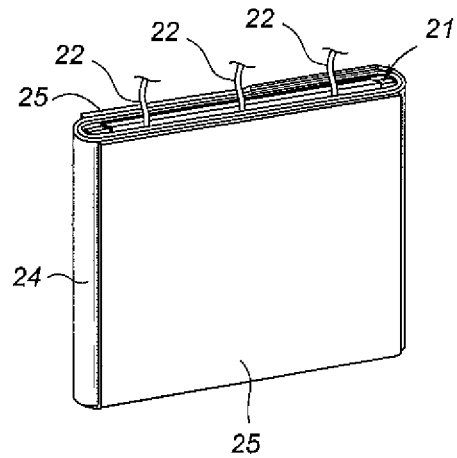
Figure 4A:
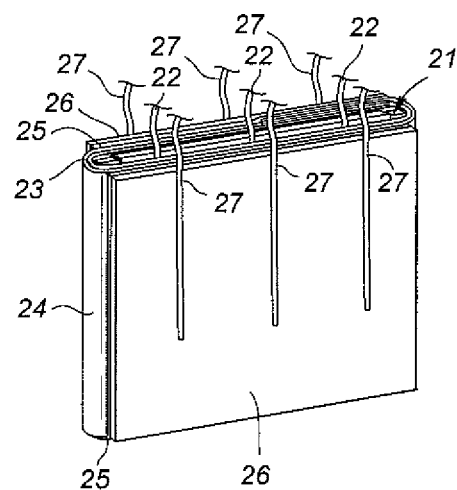
FIGS. 4a and 4b are perspective views illustrating in detail configuration of battery cells in the first embodiment shown in FIG. 1.
Figure 4B:
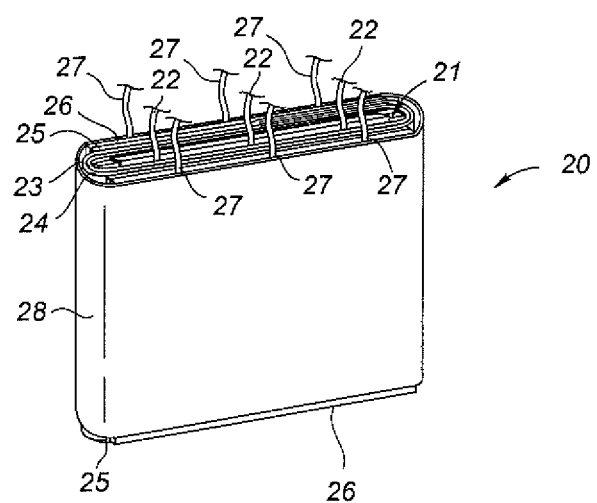

FIG. 1 illustrates configuration of a water battery 100 in a first embodiment according to the present invention, FIG. 2 illustrates basic configuration of a battery cell unit 20A in this embodiment, and FIGS. 3a, 3b, 3c and 3d and FIGS. 4a and 4b illustrate in detail configuration of the battery cells 20 in this embodiment.

As shown in FIG. 1, the water battery 100 of this embodiment is provided with a housing 10, and the battery cell unit 20A having the plurality of (two for example) battery cells 20 assembled in the housing 10. The plurality of battery cells 20 are electrically connected to in parallel or in series with each other.

The housing 10 is formed in a rectangular solid shape by molding for example a plastic material and has a box body 10a with a top opening and a cover 10b for closing the top opening. The box body 10a has an inner space for accommodating the battery cell unit 20A and a receiving portion (not shown) to fix the battery cell unit 20A. The cover 10b has a filling port 11, and a via-hole 12 for passing an anode lead wire 12a and a cathode lead wire 12b. The via-hole 12 is sealed with an adhesive as necessary after both the anode lead wire 12a and the cathode lead wire 12b are drawn there through. Also, the housing 10 is kept water-tight condition except for the filling port 11. The dimensions of the housing 10 may be appropriately selected depending upon the dimensions and the number of the battery cells unit 20A accommodated therein. In this embodiment, the dimensions are set, for example, as 85 mm in long, 55 mm in width, and 50 mm in height. The shape of the housing 10 is not limited to a rectangular solid shape, but a cylindrical shape, a cone shape, a spherical shape or any other shapes may be adapted.

Water will be supplied to the water battery 100 by injecting water of the predetermined amount into the battery 100 through the filling port 11, using an exclusive filler or dropper for example. In case that the electromotive force falls due to decrease of the water in the water battery 100, additional water will be injected into the battery through the filling port 11 to restore the electromotive force. It is possible to repeat the water supply through the filling port 11. It should be noted that the filling port 11 functions also as a vent. That is gas generated by an electrochemical reaction in the water battery 100 can be exhausted and new air can be introduced into the battery 100 through the filler port 11. It is possible to supply to the water battery 100 an electrolysis solution instead of the water. By supplying the electrolyte, fall of the electrolyte concentration at a surface of a cathode electrode plate 26 due to the electrochemical reaction can be prevented and thus a stable electrical discharge can be maintained for a long period of time.

As shown in FIG. 2, the battery cell unit 20A is constituted by two battery cells 20. In this case, a single cathode electrode plate 26 is located between the two battery cells 20 and commonly used.

As shown in FIGS. 3a, 3b, 3c and 3d and FIGS. 4a and 4b, each battery cell 20 has an anode electrode plate 21 functioned as an anode, anode drawer electrodes 22 electrically connected to the anode electrode plate 21, a collector electrode 23 closely attached to the anode electrode plate 21, a water-holding sheet 24 closely attached to the collector electrode 23, water absorptive sheets 25 having water absorptivity closely attached to the water-holding sheet 24, two cathode electrode plates 26 functioned as cathodes, constituted by two magnesium metal plates closely attached to outsides of the water absorptive sheets 25 respectively, cathode drawer electrodes 27 electrically connected to the two cathode electrode plates 26, and a fixing member 28 for pressing to each other and fixing together the anode electrode plate 21, the anode drawer electrodes 22, the collector electrode 23, the water-holding sheet 24, the water absorptive sheets 25, the cathode electrode plates 26 and the cathode drawer electrodes 27.

The anode electrode plate 21 is configured by an anode support plate 21b mounted in the center of the battery cell 20, and metal thin plates 21a with a substantially rectangular shape fixed to both surfaces of the anode support plate 21b. In this embodiment, the anode electrode plate 21 is made of a material such as a high-purity aluminum or a high-purity copper for example, having a relatively high conductivity and an ionization tendency smaller than that of magnesium. In this embodiment, particularly, a copper plate is used as for the anode electrode plate 21. The anode support plate 21b is formed from a flat plate of an insulating material such as plastic for example. In modifications, the anode electrode plate 21 may be configured only by a relatively thick copper plate without using the anode support plate 21b.

Each of the anode drawer electrodes 22 is made of a conductive metal material such as copper formed in a rectangular plate shape or a liner shape. The anode drawer electrodes 22 are fixed to the metal thin plates 21a of the anode electrode plate 21. In this embodiment, the anode drawer electrodes 22 are formed from three liner shaped electrodes fixed by spot welding to a surface of the metal thin plates 21a to have a predetermined interval with each other. One ends of the three anode drawers electrodes 22 are connected to one end of the anode lead wire 12a drawn from the housing 10.

The collector electrode 23 is made of a fabric carbon sheet. In this embodiment, the collector electrode 23 is formed in a strip-shape and wound in multilayer around the outer surface of the anode electrode plate 21.

The water-holding sheet 24 is made of a nonwoven fabric or paper having water retention characteristics. In this embodiment, the water-holding sheet 24 is formed in a strip-shape and wound in multilayer around the outer surface of the collector electrode 23.

The water absorptive sheet 25 is made of a fabric having water absorptivity. In this embodiment, the water absorptive sheet 25 is closely attached to the water-holding sheet 24 to cover both side surfaces and lower edge of this water-holding sheet 24. The water absorptive sheet 25 is fabricated by impregnating it with an electrolyte containing nitrophenol of 0.1-0.5 wt %, sodium of 1-26 wt %, citric acid of 0.5-8 wt % and polyvinyl alcohol of 0.1-1.0 wt % and then by drying it. This water absorptive sheet 25 functions as follows. First, the water absorptive sheet 25 sucks up the supplied liquid slightly accumulated on the bottom of the housing 10 by a capillary phenomenon to moisturize the whole of it so as to elute the impregnated electrolyte. Thus, this water absorptive sheet 25 functions as an electrolytic medium located between the anode and the cathode. In this case, pH of the electrolyte is within 7-13 ranges. By using an electrolyte containing nitrophenol, sodium, citric acid and polyvinyl alcohol, deposition and accumulation of magnesium hydroxide on the surface of the cathode due to the electrochemical reaction can be inhibited to obtain extremely good voltage and current characteristic. In modification, a nonwoven fabric having water absorptivity may be used for the water absorptive sheet 25.

Each of the cathode electrode plate 26 is made of a material such as a high purity magnesium for example with a higher ionization tendency than that of the anode electrode plate 21. The cathode electrode plates 26 are formed from two magnesium plates closely attached to outsides of the water absorptive sheet 25 respectively. Each of the cathode electrode plates 26 has substantially the same area as the anode electrode plate 21.

Each of the cathode drawer electrodes 27 is made of an electrically conductive metal material such as copper formed in a strip plate shape or a line shape. The cathode drawer electrodes 27 are fixed to each of the cathode electrode plates 26. In this embodiment, the cathode drawer electrodes 22 are formed from three line shaped electrodes fixed by spot welding to a surface of each cathode electrode plate 26 to have a predetermined interval with each other. One ends of the three cathode drawers electrodes 27 are connected to one end of the cathode lead wire 12b that will be drawn from the housing 10.

The fixing member 28 is formed from a tape or a thermal contraction tube wound around the outer surface of the battery cells 20 or the battery cell unit 20A to press and fix a laminated body layering with each other the anode electrode plate 21, the anode drawer electrodes 22, the collector electrode 23, the water-holding sheet 24, the water absorptive sheet 25, the cathode electrode plates 26 and the cathode drawer electrodes 27.

Measured power generation characteristics of such battery cell 20 of the water battery 200 are shown in FIGS. 5a and 5b, FIGS. 6a and 6b, FIGS. 7a and 7b, and FIGS. 8a and 8b. The battery cell shown as a comparison example is constituted by a single cathode electrode plate and uses an electrolyte containing no nitrophenol, no sodium, no citric acid and no polyvinyl alcohol. The battery cell shown as a reference example is constituted by a single cathode electrode plate and uses an electrolyte containing nitrophenol, sodium, citric acid and polyvinyl alcohol.

Figure 5A:
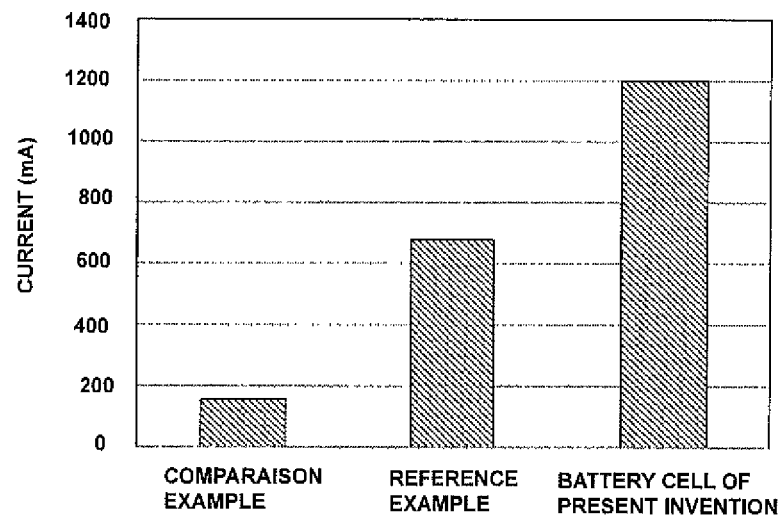
FIGS. 5a and 5b are graphs indicating initial output characteristics of the battery cell in the first embodiment shown in FIG. 1.
Figure 5B:
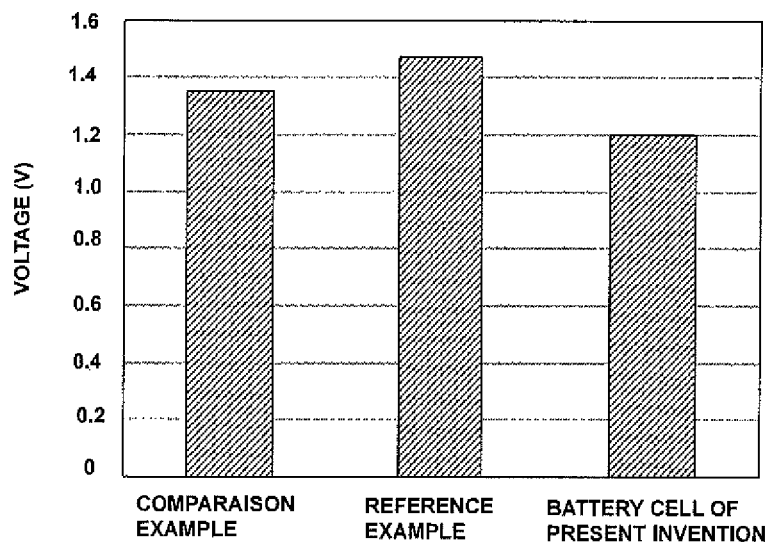

FIGS. 5a and 5b show initial output characteristics of the battery cell 20. Particularly, FIG. 5a indicates a comparison of the initial output current, and FIG. 5b indicates a comparison of the initial output voltage. As shown in FIG. 5a, the initial current of the battery cell 20 in this embodiment is larger than that of the comparison example. Also, as shown in FIG. 5b, the initial voltage of the battery cell 20 in this embodiment is slightly lower than that of the comparison example.

Figure 6A:
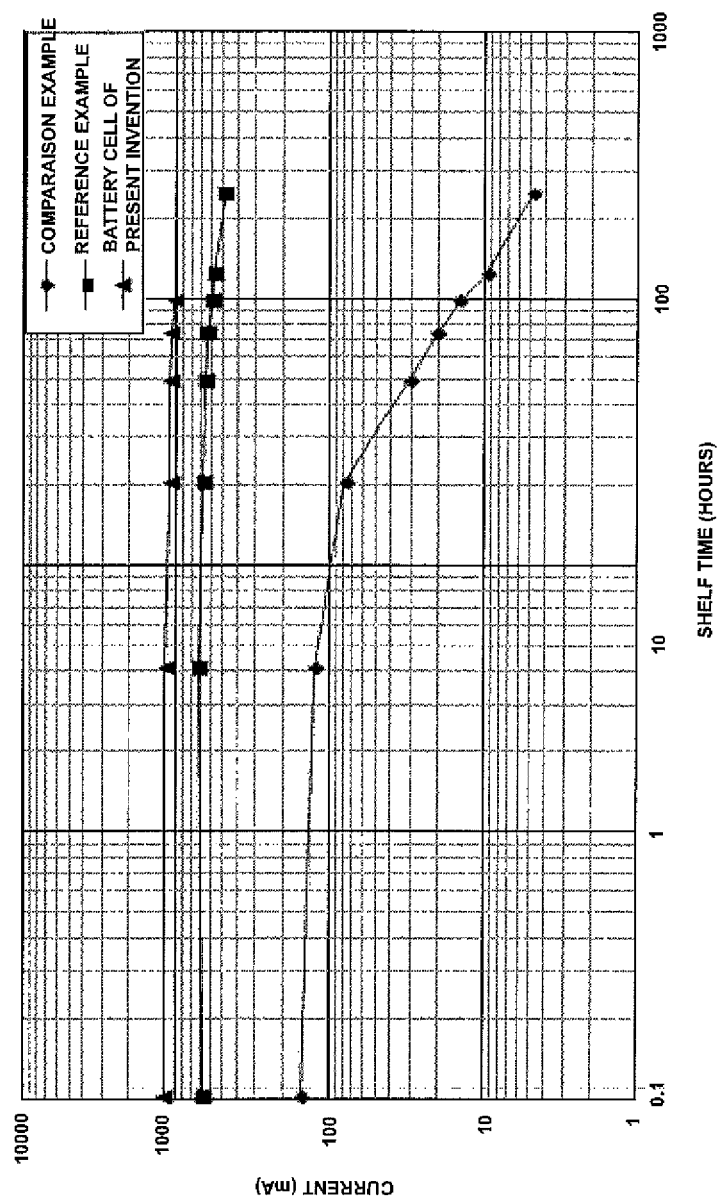
FIGS. 6a and 6b are graphs indicating shelf characteristics of the battery cell in the first embodiment shown in FIG. 1.
Figure 6B:
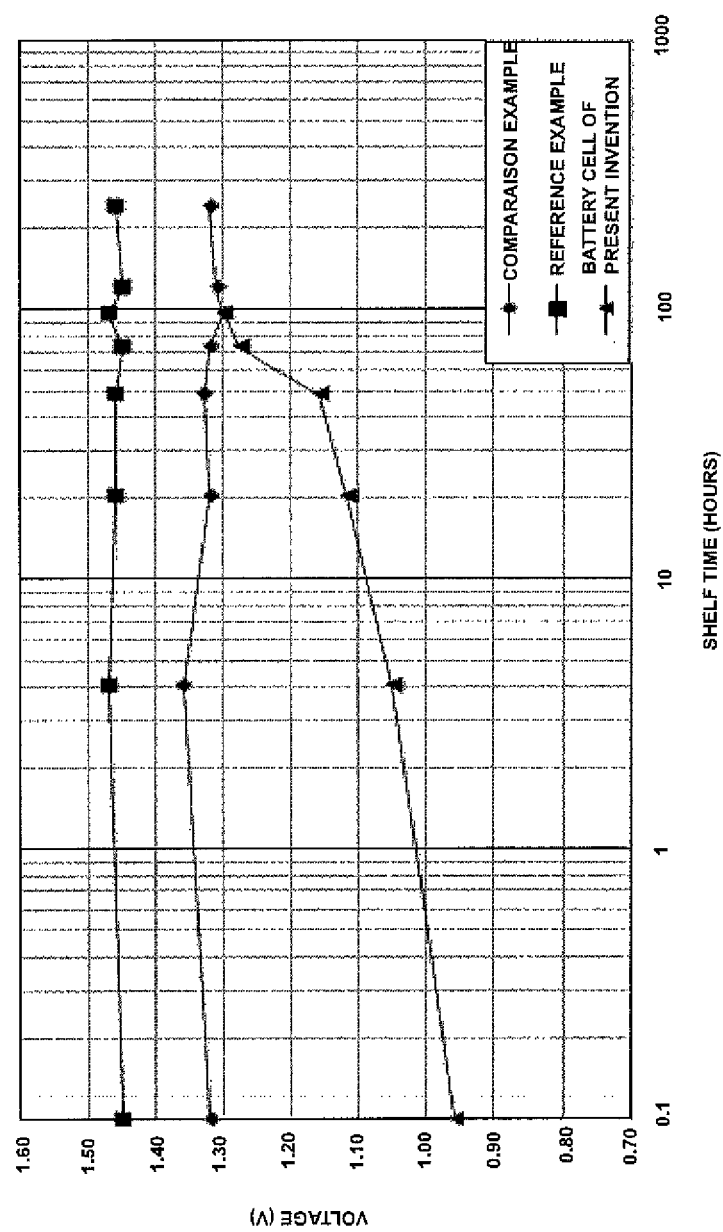

FIGS. 6a and 6b show shelf characteristics of the battery cell 20. Particularly, FIG. 6a indicates relationship between the shelf time and the discharge current, and FIG. 6b indicates relationship between the shelf time and the discharge voltage. As shown in FIG. 6a, the discharge current of the battery cell 20 in this embodiment and the reference example do not substantially change with respect to the shelf time. On the other hand, the discharge current of the comparison example lowers when the shelf time becomes longer. Also, as shown in FIG. 6b, the discharge voltage of the battery cell 20 in this embodiment indicates the tendency to increase depending upon the shelf time. On the other hand, the discharge voltage of the comparison example and the reference example do not substantially change with respect to the shelf time.

Figure 7A:
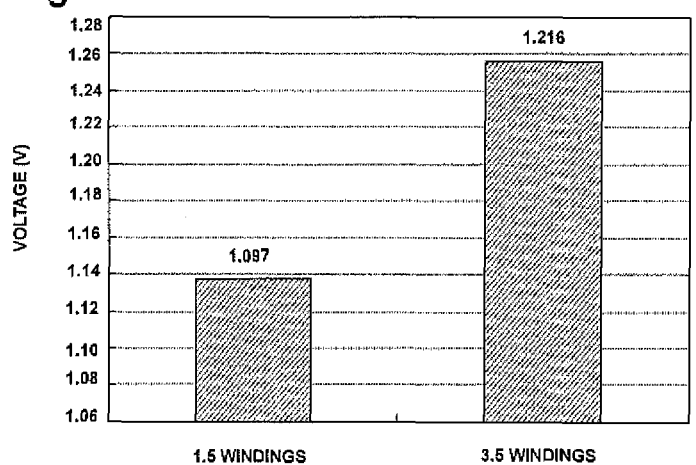
FIGS. 7a and 7b are graphs indicating relationship between the number of windings of collector electrode and the initial output characteristics of the battery cell in the first embodiment shown in FIG. 1.
Figure 7B:
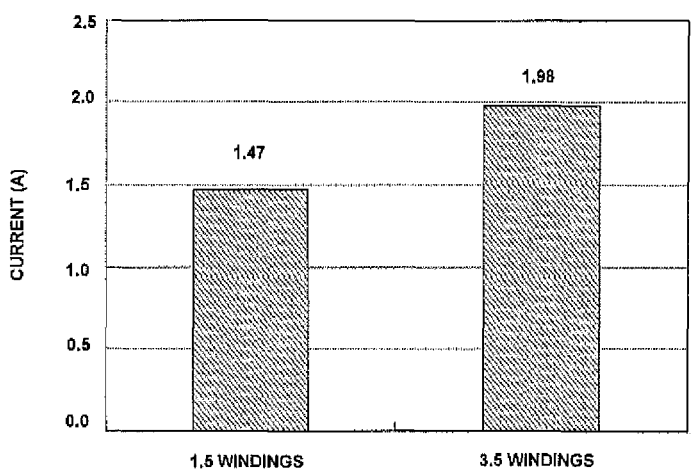

FIGS. 7a and 7b show relationship between the number of windings of the collector electrode 23 and the initial output characteristics of the battery cell 20. Particularly, FIG. 7a shows relationship between the number of windings of the collector electrode 23 and the initial output voltage, and FIG. 7b shows relationship between the number of windings of the collector electrode 23 and the initial output current. As shown in these figures, when the number of windings of the collector electrode 23 is large (3.5 windings for example), both the initial output voltage and the initial output current increase with respect to smaller windings (1.5 windings for example) of the collector electrode 23.

Figure 8A:
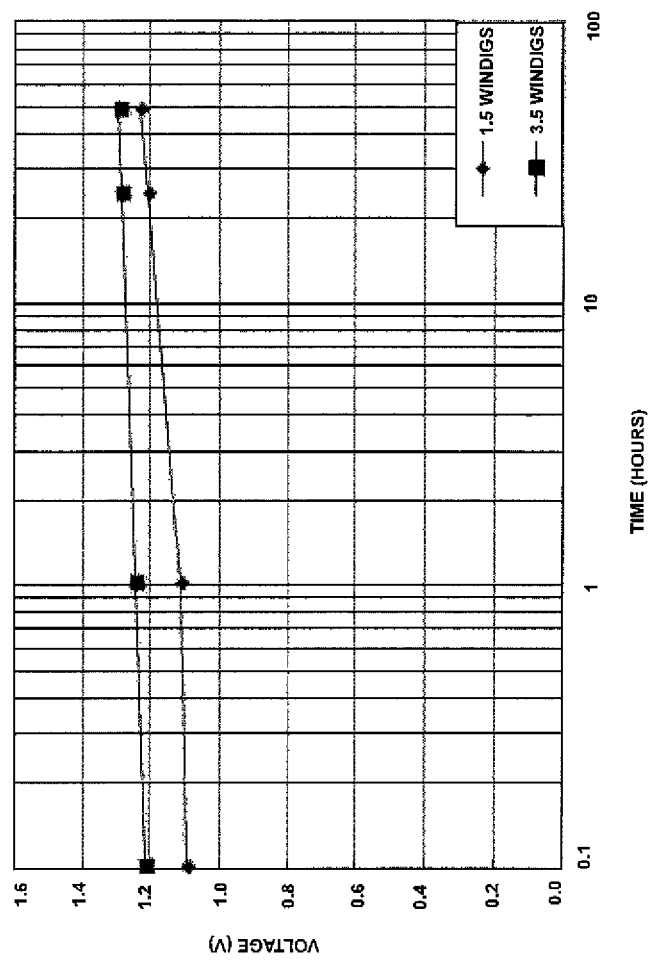
FIGS. 8a and 8b are graphs indicating temporal change in output of the battery cell in the first embodiment shown in FIG. 1.
Figure 8B:
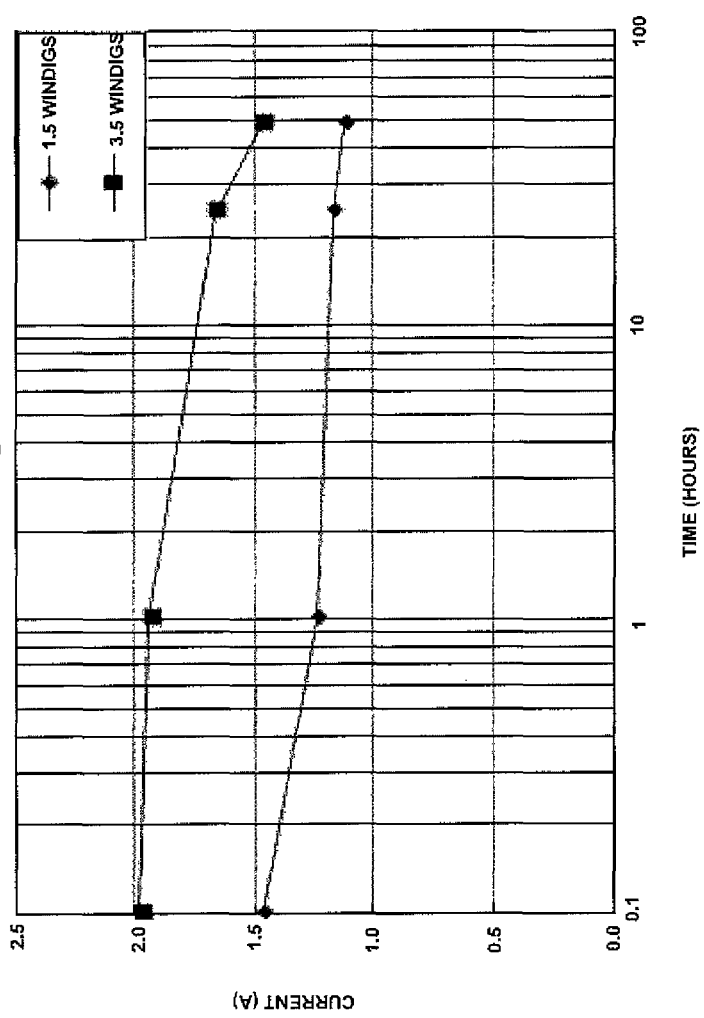

FIGS. 8a and 8b shows temporal change in output voltage and output current of the battery cell 20. Particularly, FIG. 8a shows temporal change in the output voltage of the battery cell 20 in case that the number of windings of the collector electrode 23 is 1.5 windings and 3.5 windings, and FIG. 8b shows temporal change in the output current of the battery cell 20 in case that the number of windings of the collector electrode 23 is 1.5 windings and 3.5 windings. As shown in these figures, temporal changes in the output voltage and the output current of the battery cell 20 in case of 1.5 windings has the same tendency as that in case of 3.5 windings As disclosed above in detail, the water battery 100 of this embodiment has the plurality of battery cells 20 assembled in the housing 10. Each battery cell 20 has the anode electrode plate 21, the anode drawer electrodes 22, the collector electrode 23 closely attached to the anode electrode plate 21, the water-holding sheet 24 closely attached to the collector electrode 23, the water absorptive sheets 25 closely attached to the water-holding sheet 24, the two cathode electrode plates 26 closely attached to outside of the water absorptive sheets 25 respectively, the cathode drawer electrodes 27 electrically connected to the two cathode electrode plates 26, and the fixing member 28. The water absorptive sheet 25 is fabricated by impregnating it with an electrolyte containing nitrophenol of 0.1-0.5 wt %, sodium of 1-26 wt %, citric acid of 0.5-8 wt % and polyvinyl alcohol of 0.1-1.0 wt % and then by drying it.

Thus, electromotive force characteristics of each battery cell 20 are improved, and a stable discharge can be thereby maintained for a long period of time. Also, the shelf characteristics of the water battery 100 can be improved.

Figure 9:
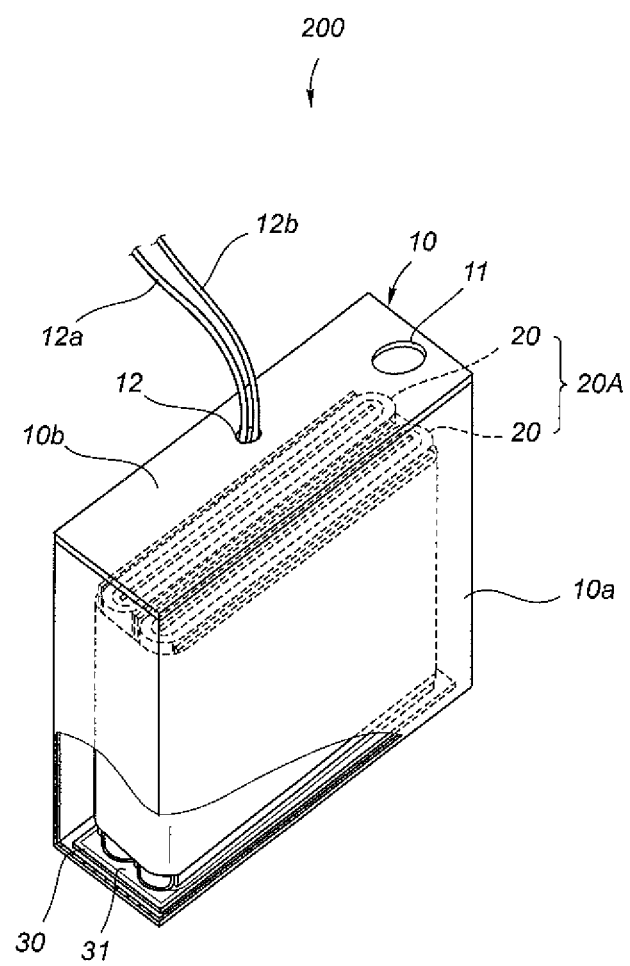
FIG. 9 is a perspective view schematically illustrating configuration of a water battery in a second embodiment according to the present invention.
Figure 10:
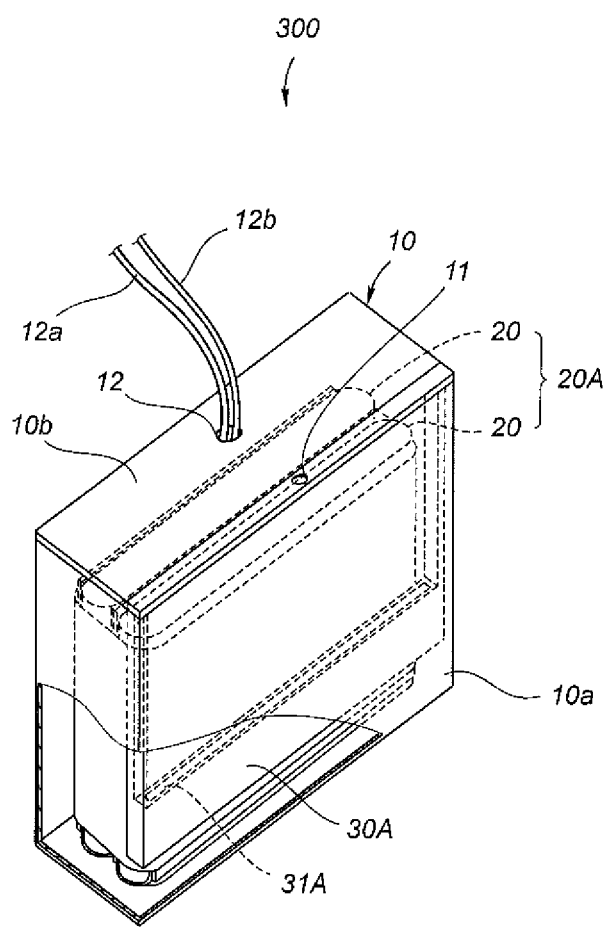
FIG. 10 is a perspective view schematically illustrating configuration of a water battery in a third embodiment according to the present invention.

FIG. 9 shows configuration of a water battery 200 in a second embodiment according to the present invention. As shown in the figure, the water battery 200 of this embodiment is provided with a housing 10, a plurality of battery cells 20 assembled in the housing 10, and an electrolyte cell 30 arranged on a bottom of the housing 10 and filled with an electrolyte.

The configurations of the housing 10 and the battery cell 20 in the water battery 200 of the this embodiment is similar to that of the water battery 100 of the first embodiment described with reference to FIG. 1 and FIG. 2, and thus detailed description is omitted.

The electrolyte cell 30 in this embodiment is placed on the bottom of the housing 10, and the upper and lower faces of the electrolyte cell 30 are covered by filtration films 31 capable of passing electrolysis solution. In the electrolyte cell 30, an electrolyte is filled with a density of 0.4-0.5 mg/m$^3$ for example.

According to the water battery 200 of this embodiment, the electrolyte cell 30 is arranged on the bottom of the housing 10. Thus, if water is injected into the housing 10 through the filling port 11, the electrolyte in the electrolyte cell 30 is dissolved to form electrolysis solution. The dissolved electrolysis solution is sucked by the water absorptive sheet 25 and refilled in this water absorptive sheet 25. Therefore, it is possible to prevent lowering of the electrolyte concentration at the surface of the cathode electrode plate 26 due to the electrochemical reaction and to maintain a stable electrical discharge for a long period of time.

Other functions and advantages of the water battery 200 in this embodiment are similar to these of the water battery 100 in the previously described first embodiment.

FIG. 10 and FIGS. 11a, 11b and 11c show configuration of a water battery 300 in a third embodiment according to the present invention. Particularly, FIG. 11a shows a plan view of the water battery 300, FIG. 11b shows an A-A line cross-section of FIG. 11a, and FIG. 11c shows a B-B line cross-section of FIG. 11a. As shown in these figures, the water battery 300 in this embodiment is provided with a housing 10, a plurality of battery cells 20 assembled in the housing 10, and an electrolyte cell 30A arranged between a sidewall of the housing 10 and the battery cells 20 and filled with a electrolyte.

The configurations of the housing 10 and the battery cell 20 in the water battery 300 of this embodiment are similar to that of the water battery 100 of the above-described first embodiment, and thus detailed description is omitted.

The electrolyte cell 30A in this embodiment is placed between the sidewall of the housing 10 and the battery cells 20 and has a filling port 11 through its upper face. The upper and lower faces of the electrolyte cell 30A are covered by filtration films 31A capable of passing electrolysis solution.

According to the water battery 300 of this embodiment, since the electrolyte cell 30A is arranged between the sidewall of the housing 10 and the battery cells 20, when water is injected into the housing 10 through the filling port 11 of the electrolyte cell 30A, the electrolyte in the electrolyte cell 30A is dissolved to form electrolysis solution. The dissolved electrolysis solution flows through the filtration film 31A formed through the lower face of the electrolyte cell 30A into the bottom of the housing 10 and then sucked by the water absorptive sheet 25 and refilled in this water absorptive sheet 25. Therefore, it is possible to prevent lowering of the electrolyte concentration at the surface of the cathode electrode plate 26 due to the electrochemical reaction and to maintain a stable electrical discharge for a long period of time.

Other functions and advantages of the water battery 300 in this embodiment are similar to these of the water battery 100 in the previously described first embodiment.

Table 1 shows differences in measured output currents depending upon methods of refilling the electrolyte. The output current was measured by connecting a 5V-boosting circuit and a LED (Red LED 50 pcs) load.

TABLE 1

| Refilling Method | Short-Circuited Current (mA) | Loaded Output Current (mA) |
|---|---|---|
| Direct Injection of Electrolyte | 670 | 20 |
| Electrolyte Cell on Bottom | 1000 | 305 |
| Electrolyte Cell at Sidewall | 840 | 70 |

As shown in Table 1, the short-circuited current and the loaded output current when the electrolyte cell 30 is placed on the bottom of the housing 10 were the largest. Also, it was revealed that the short-circuited current and the loaded output current when the electrolyte cell 30A was placed between the sidewall of the housing 10 and the battery cells 20 were larger than these where the electrolyte was directly injected. That is, if the electrolyte cell 30 or 30A filled with the electrolyte is provided as in the water battery 200 or 300, electromotive force characteristics can be improved and a stable electrical discharge can be maintained for a long period of time.

FIG. 12 shows configuration of a water battery 400 in a fourth embodiment according to the present invention. As shown in the figure, the water battery 400 in this embodiment is provided with a housing 10, a plurality of battery cells 20 assembled in the housing 10, and an electrolysis solution cell 40 arranged between a sidewall of the housing 10 and the battery cells 20 and filled with a electrolysis solution.

The configurations of the housing 10 and the battery cell 20 in the water battery 400 of the this embodiment are similar to these of the water battery 100 of the above-described first embodiment, and thus detailed description is omitted.

The electrolysis solution cell 40 in this embodiment is constituted by a removable cassette-type box filled with an electrolysis solution formed by dissolving an electrolyte in water. This electrolysis solution cell 40 has a main body 41 and a cover 42 for sealing an upper end of the main body 41. The cover 42 has a via hole 42a. On the surface of the cover 42, provided is a detachable adhesive sealing tape 44 for sealing the via hole 42a. A bottom plate for covering a lower face of the main body 41 has a strip-shaped aperture 41a. On the bottom plate, a filtration film 43 capable of passing the electrolysis solution is provided to cover the aperture 41a. Also, a detachable adhesive sealing tape 45 for sealing the aperture 41a is attached to the outer surface of the bottom plate of the main body 41. When this electrolysis solution cell 40 is mounted in the housing 10, at first, the detachable adhesive sealing tape 45 attached on the outer surface of the bottom plate of the main body 41 is removed as shown with an arrow A in FIG. 12. Then, the electrolysis solution cell 40 is inserted into the housing 10. After the electrolysis solution cell 40 is inserted into the housing 10, the detachable adhesive sealing tape 44 attached on the surface of the cover 42 is removed as shown with an arrow B in FIG. 12. Then, the electrolysis solution will flow out from the aperture 41a through the filtration film 43. Therefore, the electrolysis solution will be retained on the bottom of the housing 10. This electrolysis solution is sucked by the water absorptive sheet 25 and refilled in this water absorptive sheet 25. In case it is necessary to stop the flowing out of the electrolysis solution, the detachable adhesive sealing tape 44 will be attached again onto the surface of the cover 42. As will be noted from the above description, according to this embodiment, the electrolysis solution can be directly introduced to supply the electrolyte in the battery cells 20. It should be noted that this electrolysis solution cell 40 can be exchanged. Also, it is possible to inject an electrolysis solution through the via hole 42a into the electrolysis solution cell 40.

According to the water battery 400 of this embodiment, the electrolysis solution cell 40 is arranged between the sidewall of the housing 10 and the battery cells 20. Thus, after the electrolysis solution is flowed out from the electrolysis solution cell 40 into the bottom space of the housing 10, without injecting water into the housing 10, the flowed electrolysis solution is sucked by the water absorptive sheet 25 and refilled in this water absorptive sheet 25. Therefore, it is possible to prevent lowering of the electrolyte concentration around the surface of the cathode electrode plate 26 due to the electrochemical reaction and to maintain a stable electrical discharge for a long period of time. Also, according to this embodiment, since the electrolysis solution cell 40 is a cassette type, it is possible to exchange it with a new electrolysis solution cell, the water battery 400 can be utilized for a long period of time.

Figure 13:
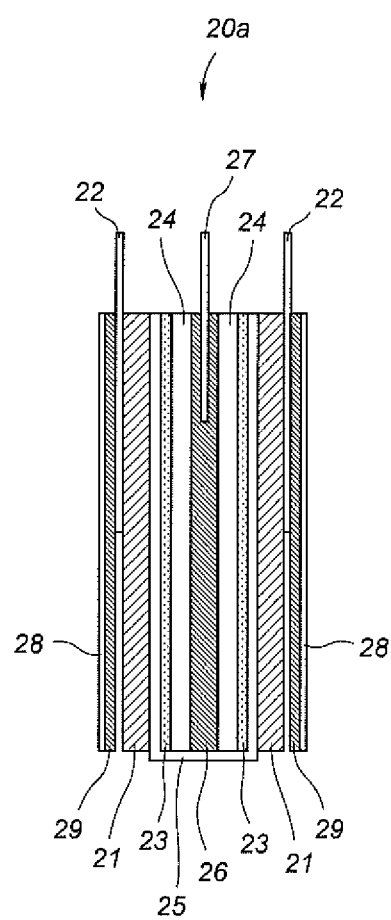
FIG. 13 is a sectional view schematically illustrating configuration of other example of the battery cell.

FIG. 13 shows configuration of other example of the battery cell. As shown in the figure, the battery cell 20a has a cathode electrode plate 26 formed from a magnesium metal plate and functioned as a cathode, a cathode drawer electrode 27 electrically connected to the cathode electrode plate 26, water-holding sheets 24 closely attached to the cathode electrode plate 26, collector electrodes 23 closely attached to the water-holding sheets 24 respectively, a water absorptive sheet 25 closely attached to the collector electrodes 23, anode electrode plates 21 functioned as an anode and constituted by two metal plates such as copper plates closely attached to outsides of the water absorptive sheet 25 respectively, anode drawer electrodes 22 electrically connected to the anode electrode plates 21 respectively, reinforcement plates 29 constituted by two metal plates and closely attached to outsides of the anode electrode plates 21 respectively, and a fixing member 28 for pressing to each other and fixing together the reinforcement plates 29, the anode drawer electrodes 22, the anode electrode plates 21, the water absorptive sheet 25, the collector electrodes 23, the water-holding sheets 24, the cathode electrode plate 26 and the cathode drawer electrode 27.

In this example, the cathode electrode plate 26 is a single magnesium metal plate with a predetermined thickness arranged at the center of the laminated battery cell 20a. The cathode drawer electrode 27 is mounted through a hole formed in an upper part of the cathode electrode plate 26. The anode electrode plates 21 are formed from two metal plates arranged in outer layer parts of the laminated battery cell 20a and reinforced by the reinforcement plates 29. By using such battery cell 20a the similar advantages as these in the above-described first embodiment can be obtained.

Figure 14A:
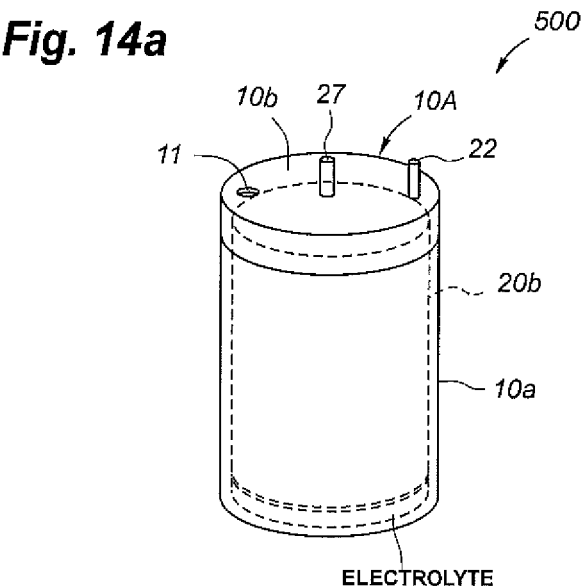
FIGS. 14a and 14b are a perspective view and a sectional view schematically illustrating configuration of a water battery in a fifth embodiment according to the present invention.
Figure 14B:
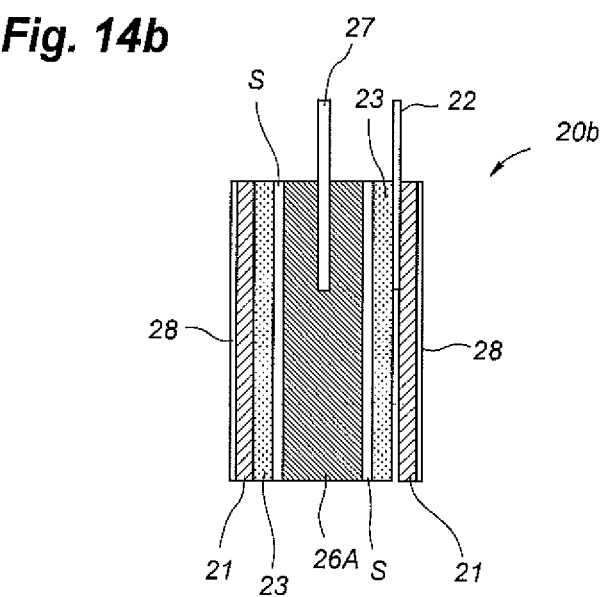

FIGS. 14a and 14b show constitution of a water battery 500 in a fifth embodiment according to the present invention. Particularly, FIG. 14a shows a perspective view of the water battery 500, and FIG. 14b shows a cross-sectional view of the battery cell 20b. As shown in these figures, the water battery 500 in this embodiment is provided with a cylindrical housing 10A and a columnar battery cell 20b mounted in the housing 10A. An electrolyte is filled in the housing 10A of the water battery 500. In this embodiment, the electrolyte is directly injected and filled in the housing 10A. However, in modifications, the electrolyte may be provided by using an electrolyte cell as done in the water battery 200 of the above-described second embodiment.

The battery cell 20b has a cathode electrode 26A formed from a columnar-shaped magnesium metal material, a cathode drawer electrode 27 electrically connected to the cathode electrode 26A, a sheet member S closely attached to outsides of the cathode electrode 26A with water absorption and water retaining performances, a collector electrode 23 closely attached to the outer circumferential wall of the sheet member S, an anode electrode plate 21 functioned as an anode and constituted by a metal plate such as a copper plate closely attached to outside of the collector electrode 23, an anode drawer electrode 22 electrically connected to the anode electrode plate 21, and a fixing member 28 for pressing to each other and fixing together the anode electrode plate 21, the anode drawer electrodes 22, the collector electrode 23, the sheet member S, the cathode electrode 26A and the cathode drawer electrode 27. The sheet member S is fabricated by impregnating a nonwoven fabric with water absorption and water retaining performances with an electrolyte containing nitrophenol of 0.1-0.5 wt %, sodium of 1-26 wt %, citric acid of 0.5-8 wt % and polyvinyl alcohol of 0.1-1.0 wt % and then by drying them.

According to the water battery 500 of this embodiment, since the columnar battery cell 20b is arranged in the cylindrical housing 10A, a compact and easily manufactured water battery can be provided.

Other functions and advantages of the water battery 500 in this embodiment are similar to these of the water battery 100 in the previously described first embodiment.

Figure 15A:
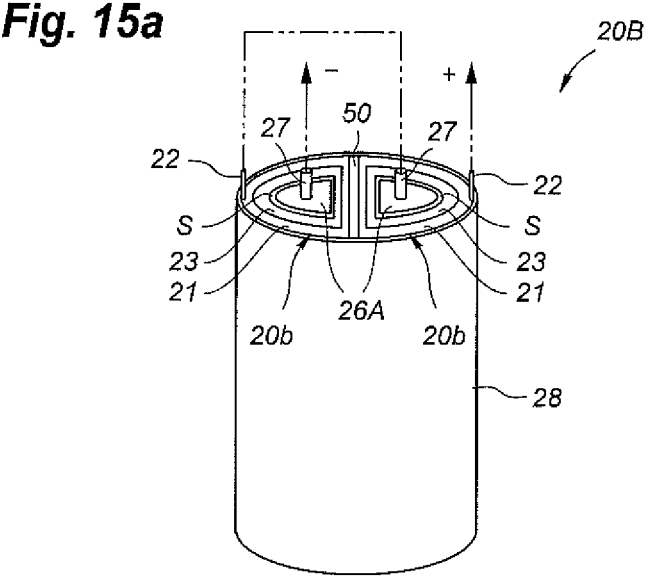
FIGS. 15a and 15b are perspective views schematically illustrating configurations of other examples of the battery cell unit.
Figure 15B:
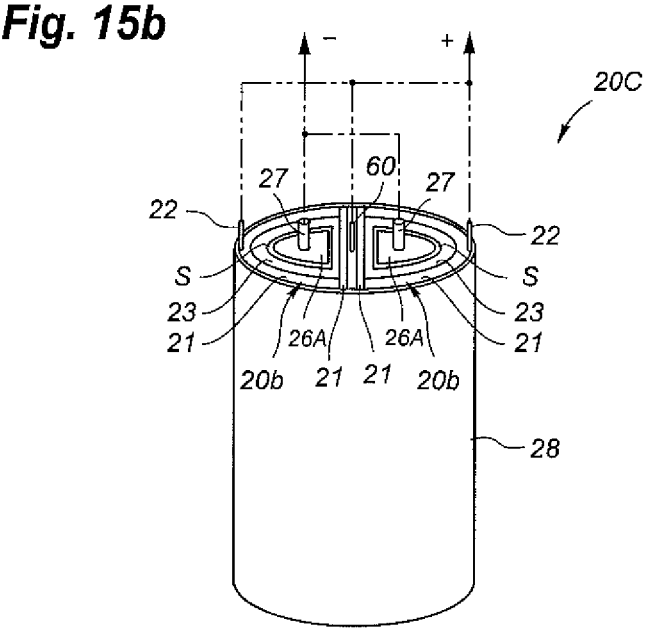

In modifications of the water battery 500, a plurality of the battery cells 20b may be arranged within the housing 10A. In this case, the plurality of (two for example) semicircular columnar battery cells 20b may be used to form battery cell units 20B and 20C as shown in FIGS. 15a and 15b, respectively. In FIG. 15a, the two battery cells 20b are serially-connected. An insulation board 50 is mounted between the two battery cells 20b. In FIG. 15b, the two battery cells 20b are connected in parallel. A common anode drawer electrode 60 is mounted between the two battery cells 20b.

Figure 16A:
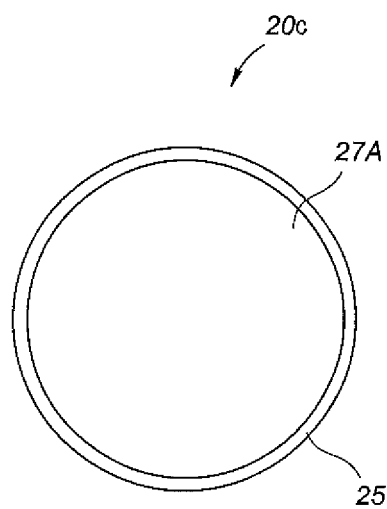
FIGS. 16a and 16b are a plane view and a sectional view schematically illustrating configurations of other examples of the battery cell.
Figure 16B:
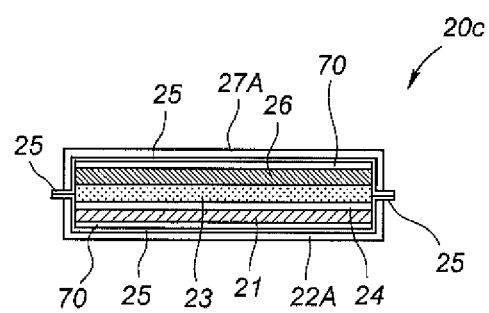

FIGS. 16a and 16b show another configuration example of the battery cell. Particularly, FIG. 16a shows an outer shape of a battery cell 20c, and FIG. 16b shows a cross-section of the battery cell 20c. As shown in these figures, the battery cell 20c has a coin shape and is provided with an anode electrode plate 21 functioned as an anode and constituted by a metal plate such as a copper plate, an anode drawer electrode 22A electrically connected to the anode electrode plate 21, a collector electrode 23, a water-holding sheet 24 closely mounted between the anode electrode plate 21 and one face of the collector electrode 23, a cathode electrode plate 26 formed from a magnesium metal plate, closely attached to the other face of the collector electrode 23, and functioned as a cathode, a cathode drawer electrode 27A electrically connected to the cathode electrode plate 26, and a water absorptive sheet 25 arranged on inner surface of the anode drawer electrode 22A and the cathode drawer electrode 27A. A conductive paste 70 is provided between the anode electrode plate 21 and the water absorptive sheet 25 and between the cathode electrode plate 26 and the water absorptive sheet 25. The water absorptive sheet 25 is fabricated by impregnating an electrolyte containing nitrophenol of 0.1-0.5 wt %, sodium of 1-26 wt %, citric acid of 0.5-8 wt % and polyvinyl alcohol of 0.1-1.0 wt % and then by drying it.

In this example, the anode drawer electrode 22A and the cathode drawer electrode 27A are formed in the shape of a cap. The anode electrode plate 21, the water-holding sheet 24, the collector electrode 23, the cathode electrode plate 26, and the water absorptive sheet 25 are pressed to each other and fixed together by means of the anode drawer electrode 22A and the cathode drawer electrode 27A. The water absorptive sheet 25 is exposed outside at a position between the anode drawer electrode 22A and the cathode drawer electrode 27A. Thus, the water absorptive sheet 25 can absorb water from the outside. Advantages of the water battery using such battery cells 20c are similar to these of the water battery 100 in the previously described first embodiment. Further, by using such battery cells 20c, a smaller water battery can be obtained.

Although, in the water batteries 100, 200, 300 and 400 of the above-described embodiments, the battery cell unit 20A has two battery cells 20, the present invention is not limited to have two battery cells, but may have one or three or more battery cells.

In the aforementioned embodiments, the collector electrode 23 of the water batteries 100, 200, 300, 400 and 500 is formed from a fabric carbon sheet. Although it is desired to use a fabric carbon sheet as the collector electrode, the present invention is not limited thereto.

Figure 17A:
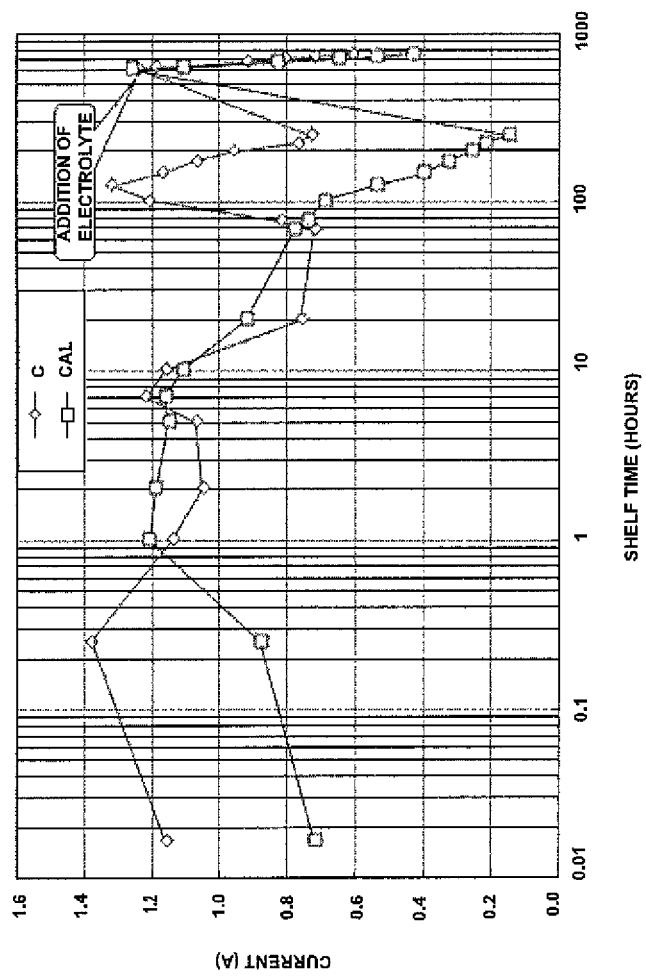
FIGS. 17a and 17b are views comparing shelf characteristics of a battery cell using a carbon sheet and a battery cell using a complex of a carbon sheet and a carbon aluminum foil.
Figure 17B:
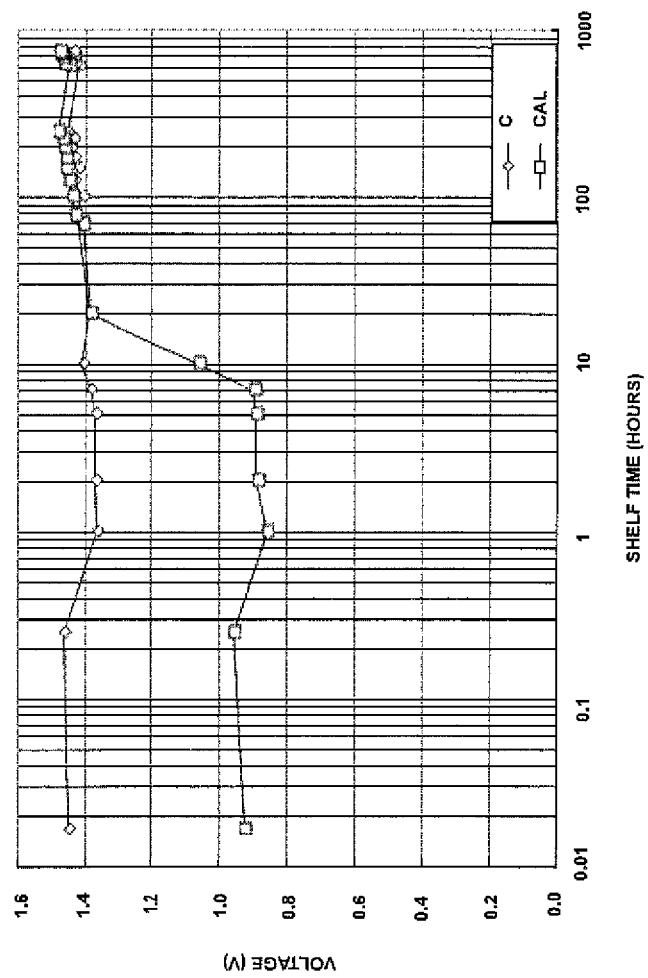

FIGS. 17*a* and 17*b* compare shelf characteristics of a battery cell 20 using a fabric carbon sheet and a battery cell 20 using a complex of a fabric carbon sheet and a carbon aluminum foil. FIG. 17*a* indicates a relationship between the shelf time and the discharge current, and FIG. 17*b* indicates a relationship between the shelf time and the discharge voltage. Each battery cell used had a single anode electrode plate of 50 mm×80 mm and two cathode electrode plates. The electrolysis solution with purified sodium of 20% was injected by 9 cc into the water battery. In the figures, C indicates a fabric carbon sheet and CAL indicates a complex of a carbon sheet and a carbon aluminum foil. As shown in these figures, both the discharge current and the discharge voltage of the battery cell 20 using only the fabric carbon sheet for the collector electrode 23 are relatively larger than that using the complex of the carbon sheet and the carbon aluminum foil.

In modifications, an anticorrosion coating may be provided on the surfaces of the cathode electrode plate 26 of the water batteries 100, 200, 300, 400 and 500. This anticorrosion coating can restrain precipitation of magnesium hydroxide on the surface of the cathode electrode occurred by an electrochemical reaction, and thus a stable electrical discharge can be maintained for a long period of time.

In the water batteries 100, 200, 300, 400 and 500 of the aforementioned embodiments, an electrolysis solution may be filled in the housing 10 and 10A beforehand, and the battery cells 20, 20*a* and 20*b* may be immersed in the electrolysis solution.

Although, in the water batteries 100, 200, 300, 400 and 500 of the above-described embodiments, the anode lead wire 12*a* and the cathode lead wire 12*b* were drawn out through the via-hole 12, the present invention is not limited to this configuration. In modifications, an anode terminal and a cathode terminal may be formed on the cover 10*b* without forming the via-hole 12, and the anode terminal and the cathode terminal may be electrically connected to the anode and the cathode of the battery cell unit 20A by internal connection, respectively.

Many widely different embodiments of the present invention may be constructed without departing from the spirit and scope of the present invention. It should be understood that the present invention is not limited to the specific embodiments described in the specification, except as defined in the appended claims.

INDUSTRIAL APPLICABILITY

The present invention can be applied to readily prepare a water battery with a low cost, which can generate electrical power by just injecting liquids such as water in the emergency such as disasters. The present invention can be also applied to improve preserving property of the water battery.

The invention claimed is:

1. A water battery comprising a housing and at least one battery cell mounted in said housing, capable of operating by injecting water into said housing at the time of use, said at least one battery cell comprising an anode made of a metal material with a lower ionization tendency than that of magnesium, an anode drawer electrode electrically connected to said anode, a cathode made of a magnesium material, a cathode drawer electrode electrically connected to said cathode, a collector electrode mounted between said anode and said cathode and wound in at least one layer around the anode, a sheet member with water absorptivity and water retention, closely attached to said collector electrode, and a fixing member for pressing to each other and fixing together said anode, said collector electrode, said sheet member and said cathode, said sheet member including an electrolyte containing nitrophenol, sodium, citric acid and polyvinyl alcohol.

2. The water battery as claimed in claim 1, wherein said anode is formed from a metal plate, and said collector electrode is closely attached to a surface of said anode, wherein said sheet member comprises a water absorptive sheet having water absorptivity, closely attached to an outer surface of said collector electrode, and a water-holding sheet having water retentivity, closely attached to an outer surface of said water absorptive sheet, wherein said cathode is formed from two magnesium plates closely attached to outer faces of said water absorptive sheet, respectively, and said cathode drawer electrode is electrically connected to said two magnesium plates, and wherein said water absorptive sheet includes an electrolyte containing nitrophenol, sodium, citric acid and polyvinyl alcohol.

3. The water battery as claimed in claim 1, wherein said cathode is formed from a magnesium plate, wherein said sheet member comprises a water-holding sheet having water retentivity, closely attached to an outer side face of said cathode, and a water absorptive sheet having water absorptivity, closely attached to an outer face of said water-holding sheet, wherein said anode is formed from two metal plates closely attached to outer faces of said water absorptive sheet, respectively, and said cathode drawer electrode is electrically connected to said two metal plates, and wherein said water absorptive sheet includes an electrolyte containing nitrophenol, sodium, citric acid and polyvinyl alcohol.

4. The water battery as claimed in claim 1, wherein said water battery further comprises an electrolyte cell filled with the electrolyte.

5. The water battery as claimed in claim 4, wherein said electrolyte cell is arranged on a bottom of said housing.

6. The water battery as claimed in claim 4, wherein said electrolyte cell is arranged between an inner side wall of said housing and said battery cell.

7. The water battery as claimed in claim 1, wherein said water battery further comprises a removable cassette-shaped electrolysis solution cell filled with a solution of the electrolyte.

8. The water battery as claimed in claim 1, wherein said cathode is made of a magnesium material formed in a circular columnar shape or a rectangular columnar shape, and said cathode drawer electrode is mounted in a hole formed at an upper part of said cathode, wherein said sheet member is closely attached to a side face of said cathode, wherein said collector electrode is closely attached to outside of said sheet member, and wherein said anode is closely attached to outside of said collector electrode.

9. The water battery as claimed in claim 8, wherein the electrolyte is filled in a lower part of said housing.

10. The water battery as claimed in claim 1, wherein the water battery comprises said housing and a battery cell unit consisting of a plurality of battery cells mounted in said housing, and wherein the plurality of battery cells are electrically connected in parallel or in series with each other.

11. The water battery as claimed in claim 2, wherein the water battery comprises said housing and a battery cell unit consisting of a plurality of battery cells mounted in said housing, and wherein the plurality of battery cells are electrically connected in parallel or in series with each other.

12. The water battery as claimed in claim 3, wherein the water battery comprises said housing and a battery cell unit consisting of a plurality of battery cells mounted in said housing, and wherein the plurality of battery cells are electrically connected in parallel or in series with each other.

13. The water battery as claimed in claim 4, wherein the water battery comprises said housing and a battery cell unit consisting of a plurality of battery cells mounted in said housing, and wherein the plurality of battery cells are electrically connected in parallel or in series with each other.

14. The water battery as claimed in claim 5, wherein the water battery comprises said housing and a battery cell unit consisting of a plurality of battery cells mounted in said housing, and wherein the plurality of battery cells are electrically connected in parallel or in series with each other.

15. The water battery as claimed in claim 6, wherein the water battery comprises said housing and a battery cell unit consisting of a plurality of battery cells mounted in said housing, and wherein the plurality of battery cells are electrically connected in parallel or in series with each other.

16. The water battery as claimed in claim 7, wherein the water battery comprises said housing and a battery cell unit consisting of a plurality of battery cells mounted in said housing, and wherein the plurality of battery cells are electrically connected in parallel or in series with each other.

17. The water battery as claimed in claim 1, wherein the water battery comprises said housing and a battery cell unit consisting of a plurality of battery cells mounted in said housing, and wherein a common anode or cathode is arranged between neighboring battery cells of said plurality of battery cells.

18. The water battery as claimed in claim 1, wherein said sheet member includes the electrolyte containing nitrophenol of 0.1-0.5 wt %, sodium of 1-26 wt %, citric acid of 0.5-8 wt % and polyvinyl alcohol of 0.1-1.0 wt %.

19. The water battery as claimed in claim 2, wherein said water absorptive sheet includes the electrolyte containing nitrophenol of 0.1-0.5 wt %, sodium of 1-26 wt %, citric acid of 0.5-8 wt % and polyvinyl alcohol of 0.1-1.0 wt %.

20. The water battery as claimed in claim 3, wherein said water absorptive sheet includes the electrolyte containing nitrophenol of 0.1-0.5 wt %, sodium of 1-26 wt %, citric acid of 0.5-8 wt % and polyvinyl alcohol of 0.1-1.0 wt %.

* * * * *